R. W. EMERSON & F. BISHOP.
GAS COMPRESSOR.
APPLICATION FILED OCT. 28, 1908.
962,203. Patented June 21, 1910.
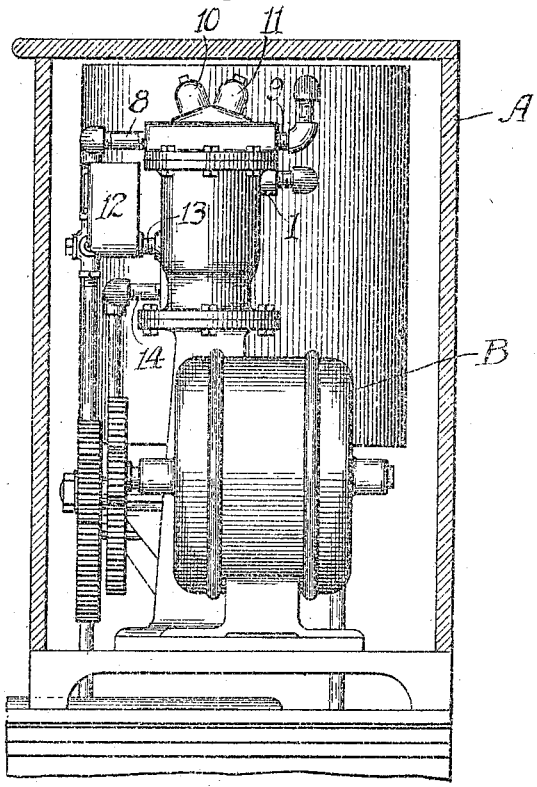
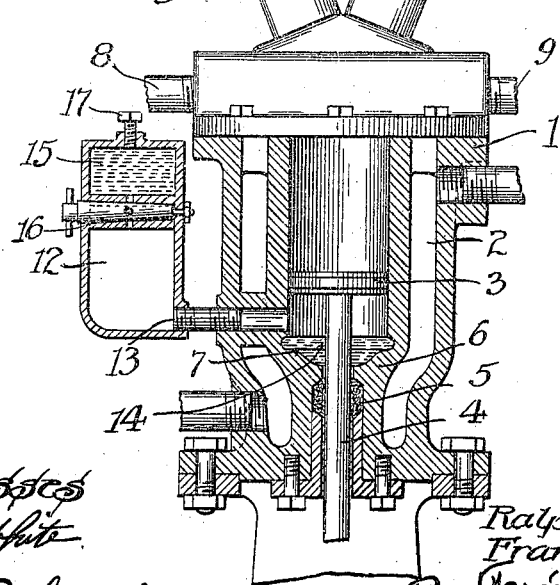
Witnesses
R. A. White
Harry R. L. White
Inventor
Ralph W. Emerson
Frank Bishop
By Foree Bain & May
Attys

UNITED STATES PATENT OFFICE.

RALPH W. EMERSON AND FRANK BISHOP, OF SOUTH BEND, INDIANA.

GAS-COMPRESSOR.

962,203.

Specification of Letters Patent.

Patented June 21, 1910.

Application filed October 28, 1908. Serial No. 459,850.

*To all whom it may concern:*

Be it known that we, RALPH W. EMERSON and FRANK BISHOP, citizens of the United States, residing at South Bend, in the county of St. Joseph and State of Indiana, have invented certain new and useful Improvements in Gas-Compressors, of which the following is a specification.

Our invention relates to improvements in gas compressors, and has for its salient object to provide means for relieving the packing for the compressor piston rods of gas pressure and preventing the escape of gas from the end of the compression cylinder through which the piston rod works.

Compressors for gases of a character unpleasant or deleterious to human beings are often employed in environments where the prevention of leakage is highly important, as for instance in small refrigerating plants employed in dwelling houses, hotels and the like, where the escape of the ammonia or other volatile may occasion great damage or discomfort.

In general our invention contemplates the provision, in connection with a gas compressor, of a chamber, of considerable capacity, which we term a relief or equalizing chamber, preferably extraneous to the compressor structure proper, and having communication with the clearance space at that end of the compressor cylinder through which the piston rod enters. By thus increasing the volumetric capacity of the space on the "dead" side of the piston, the variation of absolute pressure therein, that is to say, between maximum rarefaction and maximum compression of the contents of said space is decreased, thereby lessening somewhat the liability of leakage of the gas to be compressed past the piston, and further, and more specifically, the relief chamber affords a relatively large space for accumulation of leaking gases without the application of undue pressure to the packing surrounding the piston rod.

In the specific construction shown, for purposes of full disclosure, A represents the casing of a refrigerator, B an electric motor therein serving to supply power to a compressor whereof 1 is the cylinder, surrounded by a cooling water jacket space 2, said cylinder having arranged therein a reciprocating piston 3 mounted on a piston rod 4 packed by a suitable gland 5 in the dead end. The piston working within the cylinder 1 leaves unobstructed a clearance space adjacent the dead end of the cylinder, and where the cylinder is vertically arranged we preferably provide the extremity of said clearance space in a cup formation 7, for a purpose to be described. Suitable inlet and outlet passages 8 and 9 are provided controllable by valves 10 and 11 of any desired or appropriate construction, for the ingress and egress of fluid to be compressed.

It will be understood that the construction thus far described is not claimed by us as *per se* of our invention, but merely as illustrative of a compressor having a piston rod extending through one end thereof, to be sealed as efficiently as possible against the leakage of gas.

The relief or equalizing chamber, constituting part of our invention, is preferably provided in the form of a hollow vessel, 12, extraneous to the compressor proper, and in open communication at its lower end with the clearance space of the dead end of the cylinder, as through the piping connection 13, constituting the only orifice to the chamber 12, and opening direct to the clearance space of the cylinder 1 above the cup 7. As a refinement of our invention we preferably provide an oil seal around the piston rod 4, by filling the cup with an oil body 14.

In operation it will be understood that the relatively large volume of air within the clearance space and chamber 12 varies its absolute pressure within smaller limits than would be true if the chamber 12 were dispensed with, thereby reducing somewhat the tendency of the gas to leak past the piston 3 on the compression stroke, and the chamber 12 provides a large area in which any gas leaking past such piston may be pocketed, any gas thus escaping tending to rise therein rather than seek an outlet around the piston rod 4.

By the means described the possibilities of leakage of gas around the piston rod are minimized.

As a further refinement of our invention we provide a convenient oiling arrangement, whereby the oil may be introduced into the cylinder to maintain the oil seal 14 and lubricate the piston, while the compressor is in operation and through the agency of equalizing chamber 12. To this end we provide on top of chamber 12, preferably as a unitary continuation thereof, an oil chamber 15, having communication with chamber 12 only through a valve 16, and having in its top a filling opening closable by a plug, as at 17.

While the machine is running the plug 17 may be removed, the chamber 15 filled with oil, and the plug replaced, and then valve 16 opened, so that the oil runs down through chamber 12 and pipe 13, into the cylinder.

While we have herein described a particular embodiment of our invention for purposes of illustration, it will be apparent that in its broader concept our invention may be embodied in widely different forms and constructions of condensers, and we do not desire to be understood as limiting our invention to any specific construction further than as specified in the claims.

Having described our invention, what we claim is;

1. In a compressor, a vertical cylinder providing a clearance space at its bottom, a piston, a piston rod entering said cylinder through its bottom, a relief chamber, a constantly open communication between the relief chamber and the clearance space in the cylinder, and an oil-supply chamber associated with the relief chamber for supplying oil to the bottom of the cylinder through the constantly open communication.

2. In a compressor, a vertical cylinder, a relief chamber, an open communication between the cylinder and the relief chamber, near the bottom thereof, and means associated with the relief chamber for supplying oil through the open communication to the bottom of the cylinder, said bottom being cupped for the reception thereof.

3. In a compressor, a vertical cylinder having its dead end at its bottom, a piston for vertical movement in the cylinder to leave a clearance space at its dead end, a piston rod for the piston passing through the bottom of the cylinder, a relief chamber, 12, and an open communication between the clearance space of the cylinder slightly above the bottom of the cylinder and the relief chamber in alinement with the bottom thereof.

4. The combination with a compressor involving a cylinder, a piston in said cylinder and a piston rod extending through the dead end of said cylinder, of a relief chamber extraneous to the cylinder in open communication adjacent its bottom with the cylinder, an oil chamber associated with the relief chamber, and a valve controlling communication between said chambers.

5. The combination with a compressor involving a cylinder, a piston in said cylinder and a piston rod extending through the dead end of said cylinder, of a relief chamber extraneous to the cylinder in open communication adjacent its bottom with the cylinder, an oil chamber above the relief chamber, a closable filling opening to the oil chamber and a valve-controlled passage from the oil chamber to the relief chamber.

In testimony whereof we hereunto set our hands.

RALPH W. EMERSON.
FRANK BISHOP.

In the presence of—
F. L. ALWARD,
CLAIR C. CALAHAN.